US012105443B2

(12) United States Patent
Ao

(10) Patent No.: US 12,105,443 B2
(45) Date of Patent: Oct. 1, 2024

(54) DEVELOPING CARTRIDGE

(71) Applicant: JIANGXI YIBO E-TECH CO. LTD., Xinyu (CN)

(72) Inventor: Shiping Ao, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 0 days.

(21) Appl. No.: 18/199,355

(22) Filed: May 18, 2023

(65) Prior Publication Data

US 2023/0393493 A1 Dec. 7, 2023

(30) Foreign Application Priority Data

Jun. 2, 2022 (CN) ......................... 202221366840.6

(51) Int. Cl.
*G03G 15/08* (2006.01)
*G03G 21/16* (2006.01)
*G03G 21/18* (2006.01)

(52) U.S. Cl.
CPC ..... *G03G 15/0889* (2013.01); *G03G 15/0898* (2013.01); *G03G 21/1652* (2013.01); *G03G 21/1857* (2013.01); *G03G 2221/1657* (2013.01); *G03G 2221/166* (2013.01)

(58) Field of Classification Search
CPC ........... G03G 15/0889; G03G 15/0898; G03G 21/1652; G03G 21/1857; G03G 2221/1657; G03G 2221/166; G03G 15/0863; G03G 15/0896; G03G 15/065
See application file for complete search history.

(56) References Cited

U.S. PATENT DOCUMENTS

| | | | | |
|---|---|---|---|---|
| 2017/0261884 A1* | 9/2017 | Kyotani | ............. | G03G 15/0863 |
| 2017/0269543 A1* | 9/2017 | Itabashi | ............. | G03G 21/1652 |
| 2020/0103786 A1* | 4/2020 | Ooka | ................. | G03G 15/0889 |

FOREIGN PATENT DOCUMENTS

| | | | |
|---|---|---|---|
| CN | 212515361 | U | 2/2021 |
| CN | 212623583 | U | 2/2021 |
| CN | 212905904 | U | 4/2021 |
| CN | 217787607 | U | 11/2022 |
| CN | 116009371 | A | 4/2023 |
| DE | 202022104527 | U1 | 9/2022 |
| WO | 2022052955 | A1 | 3/2022 |

* cited by examiner

*Primary Examiner* — Sandra Brase
(74) *Attorney, Agent, or Firm* — IPro, PLLC

(57) ABSTRACT

Disclosed herein is a developing cartridge, which is detachably mounted in an imaging device. The developing cartridge comprises: a housing; a developer roller configured to rotate about a developer roller axis extending in a first direction, and provided on a front end side of the housing in a second direction; a handle provided on a rear end side of the housing in the second direction, the rear end side being opposite to the front end side where the developer roller is located; a driving gear provided on a driving side of the housing in the first direction; an electrode with an electrical contact portion provided on a right end side of the housing in a left and right direction; a chip provided on the driving side of the housing of the developing cartridge; and a detected component provided on an opposite side of the driving side of the housing.

19 Claims, 5 Drawing Sheets

DEVELOPING CARTRIDGE

TECHNICAL FIELD

The present disclosure relates to a developing cartridge that is detachably mounted in an imaging device, wherein the imaging device is an electrophotographic image forming apparatus.

BACKGROUND

A developing cartridge can be mounted to and detached from an image forming device such as a laser printer. Such a developing cartridge includes electrodes that receive power from the image forming device. The electrodes supply the power received from the image forming device to a developer roller. In addition, the developing cartridge includes a coupler. The coupler receives driving force from the image forming device. Specifically, when the developing cartridge is mounted in the imaging device and the developing cartridge subsequently receives driving force from the imaging device, the detected component rotates. The rotation of the detected component displaces a protrusion between a contact state where the protrusion contacts the detection unit and a non-contact state where the protrusion does not contact the detection unit. This displacement of the protrusion between the contact state and the non-contact state or the number of protrusions indicates the specification of the developing cartridge. An electrode is provided adjacent to a detected component, and the detected component rotates about an electrical contact portion of the electrode.

SUMMARY

In one aspect of the present disclosure, a developing cartridge is provided, wherein a chip is added to the developing cartridge, so as to provide more information about the developing cartridge to an imaging device. In another aspect of the present disclosure, a detected component of the developing cartridge may also serve as a part of a developing electrode to simplify the structure of the developing cartridge. In yet another aspect of the present disclosure, a detected component that can move back and forth is provided, further reducing the moving trajectory of the detected component to reduce the size of the developing cartridge.

A developing cartridge, which is detachably mounted in an imaging device, comprising: a housing;

a developer roller having a developer roller shaft configured to rotate about an axis of the developer roller extending in a first direction;

an agitator having an agitator shaft extending in the first direction;

a driving gear configured to receive driving force from the outside of the developing cartridge and located on a first side of the housing in the first direction;

an agitator gear mounted at an end of the agitator shaft, the end being located on the first side of the housing;

an electrode electrically connected to the developer roller shaft, the electrode having an electrical contact portion provided on a second side of the housing opposite to the first side in the first direction; and a gear cover provided on the first side of the housing, covering at least a part of the driving gear and the agitator gear, wherein a chip holder mounted on the gear cover is provided on the first side of the housing, a chip is provided on the chip holder, the second side of the housing further comprises a first transmission component, a second transmission component and a detected component, the first transmission component is provided at an end of the agitator shaft and configured to rotate with the agitator shaft, the second transmission component can sleeved on the first transmission component to receive driving force of the first transmission component, and the detected component is configured to receive force of the second transmission component to move.

A seal may be provided between the agitator shaft and the first transmission component to prevent leakage of a developer.

The developing cartridge may further comprise a bearing plate and a side cover located on the second side of the housing, wherein the side cover covers at least a part of the bearing plate, the bearing plate is configured to support the developer roller shaft, the bearing plate is provided with a separating force receiving protrusion, the separating force receiving protrusion protrudes along the first direction, the side cover is provided with a limiting portion, and the shortest distance between the separating force receiving portion and the limiting portion in a second direction is less than 2 mm.

Preferably, the detected component is mounted on the bearing plate, a gap portion is formed between the separating force receiving protrusion and the detected component in the second direction, and the limiting portion is configured as a wall portion inserted into the gap portion.

The developing cartridge may further comprise a bearing plate located on the second side of the housing, wherein the bearing plate is configured to support the developer roller shaft, the bearing plate is provided with a separating force receiving protrusion, the separating force receiving protrusion protrudes along the first direction, and the shortest distance between the separating force receiving portion and the detected component in the second direction is less than 2 mm.

The developing cartridge may further comprise a bearing plate located on the second side of the housing, wherein the bearing plate and the detected component are each configured to form a part of the electrode, the detected component is provided with an electrical contact portion, and the electrical contact portion is also configured as a toggle portion that can be detected by the imaging device.

The developing cartridge may further comprise a bearing plate and a side cover provided on the second side of the housing, wherein the side cover covers at least a part of the bearing plate, the bearing plate is provided with a detected component mounting column, the side cover is provided with a second supporting column, the detected component is provided with a supported hole, and both the detected component mounting column and the second supporting column can be inserted into the supported hole.

The first transmission component may be integrally molded with the agitator shaft.

The developing cartridge may further comprise a bearing plate located on the second side of the housing and a supply roller configured to convey a developer to the developer roller, the bearing plate supports both the developer roller shaft and a supply roller shaft, and the bearing plate and the detected component are each configured to form a part of the electrode.

DETAILED DESCRIPTION

Figure 1:
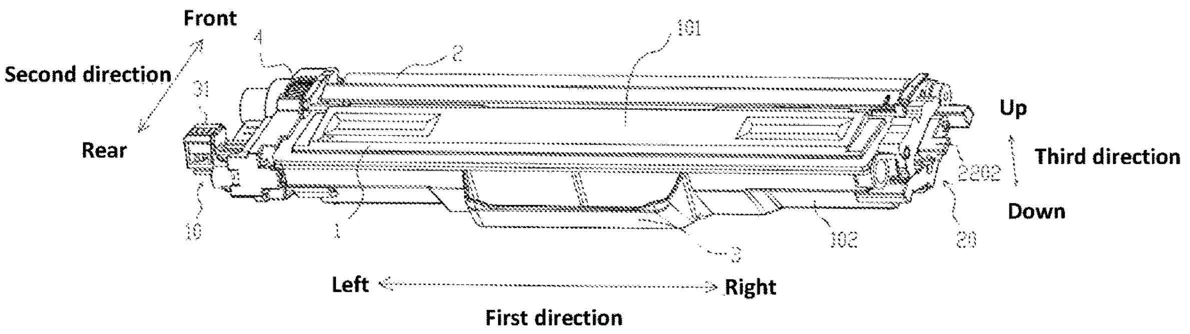
FIG. 1 is a schematic view of a three-dimensional structure of a developing cartridge provided in Embodiment 1.
Figure 2:
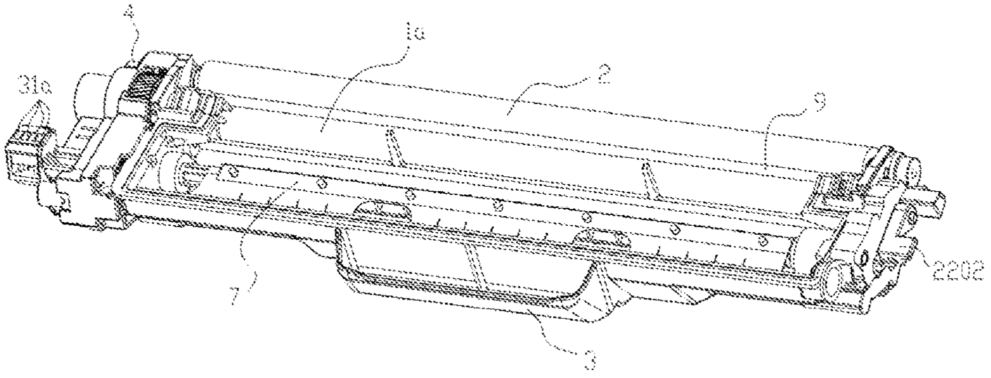
FIG. 2 is a schematic view of a three-dimensional structure of the developing cartridge provided in Embodiment 1 after an upper housing is removed.
Figure 3:
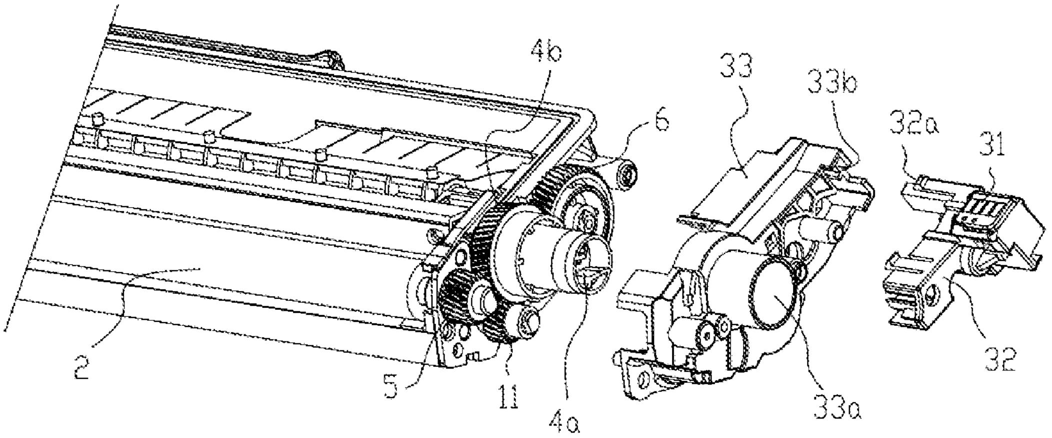
FIG. 3 is a schematic view of a partial exploded structure of a driving side of the developing cartridge provided in Embodiment 1.
Figure 4:
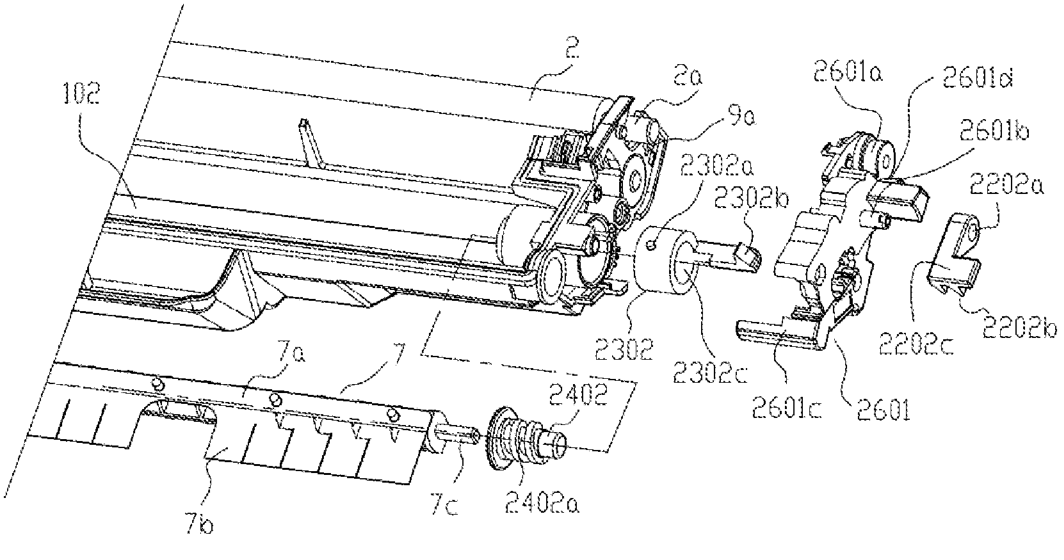
FIG. 4 is a schematic view of a partial exploded structure of an opposite side of the driving side of the developing cartridge in Embodiment 1.

In the following description, an extension direction of an axis of rotation of a developer roller is referred to as a first direction; a direction in which the developer roller and a handle of a developing cartridge are arranged is referred to as a second direction; the first direction intersects with the second direction; and the third direction intersects with both the first direction and the second direction.

Embodiment 1

First of all, as shown in FIGS. 1 to 5, a developing cartridge of the present disclosure is detachably mounted in an imaging device. The developing cartridge includes a housing 1, a developer roller 2, a handle 3, a supply roller 9, a driving gear 4, and a detected component 2202. The detected component 2202 can be detected by a detecting component in an imaging device to identify information such as the developing cartridge being a new cartridge and the page yield of the developing cartridge. The driving gear 4 can receive driving force from an imaging device outside the developing cartridge, and the supply roller 9 can convey a developer to the developer roller 2. The housing 1 has an upper housing 101 and a lower housing 102. The upper housing 101 and the lower housing 102 can define a developer accommodating portion 1*a* in combination. The developer roller 2 is rotatably supported by the housing 1 and is rotatable about a developer roller axis a extending in the first direction. The developer roller 2 is provided on the front end side of the housing 1 in the second direction, the handle 3 is provided on the rear end side of the housing 1 in the second direction, and the front end side and the rear end side are arranged opposite to each other in the second direction of the housing. The driving gear 4 is provided on a first side 10 of the housing 1 in the first direction, that is, the left end side of the housing 1 in the first direction, and a chip 31 is also provided on the first side 10 of the housing 1. The chip 31 stores authentication information associated with the developing cartridge for the imaging device to authenticate, and may communicate with the imaging device.

Figure 5:
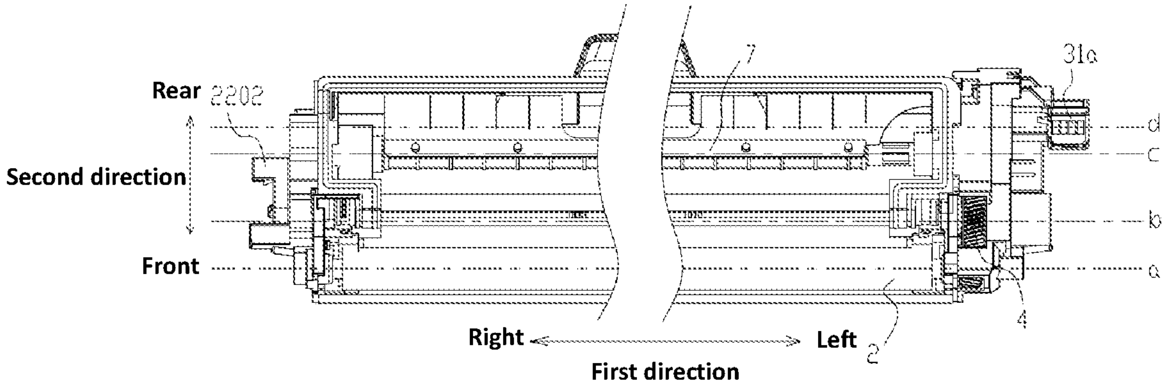
FIG. 5 is a top structural schematic view of the developing cartridge provided in Embodiment 1 after the upper housing is removed.

The housing 1 has the first side 10 and a second side 20 opposite to the first side in the first direction, the first side 10 is the left end of the housing 1, and the second side 20 is the right end of the housing 1. The first side 10 has a gear train. The gear train includes a driving gear 4, a developer roller gear 5 mounted on an end of a developer roller shaft, a supply roller gear 11 mounted on an end of a supply roller shaft, and an agitator gear 6 mounted on an end of an agitator shaft. A gear cover 33 covering the gear train is located on the first side of the housing 1, and the gear cover 33 covering at least a part of each gear in the gear train. The chip 31 is mounted on a chip holder 32. The chip holder 32 is provided with a pre-mounting buckle 32*a*, and the gear cover 33 is provided with a pre-mounting joint hole 33*b*. The pre-mounting buckle 32*a* is inserted into the pre-mounting joint hole 33*b* so that the chip holder 32 is pre-mounted in the gear cover 33, and then the chip holder 32 is fastened on the gear cover 33 by screws. The driving gear 4 has a coupling part 4*a* and a gear part 4*b*. The coupling part 4*a* may be meshed with a driving shaft (not shown) in the imaging device to receive rotational driving force, and the gear part 4*b* may drive other gears in the gear train to rotate. As shown in FIG. 5, in the second direction, the developer roller axis a, a rotation axis b of the driving gear 4, a rotation axis c of the agitator gear 6, and a virtual line d passing through an electric contact 31*a* of the chip 31 extending in the first direction are arranged in sequence. The chip 31 has a plurality of electrical contacts 31*a*, and the electrical contacts 31*a* are provided closer to the rear end of the handle 3. In other words, the chip 31 is closer to the handle 3 relative to the developer roller 2 in the second direction of the housing 1. With this design, the electrical contacts 31*a* of the chip 31 can be kept away from the rotating developer roller as much as possible to reduce vibration.

The agitator 7 is mounted with the agitator gear 6 at the end of the first side of the housing. A first transmission component 2402 is provided on the second side of the housing 1 in the first direction. The first transmission component 2402 may be mounted on an end of the agitator 7, or may also be integrally molded with the agitator 7, which is not limiting. When adopting a structure in which the first transmission portion is mounted on the end of the agitator 7, the agitator 7 includes an agitator shaft 7*a*, an agitation blade 7*b* and an incomplete circular protrusion 7*c* located at a second side end of the agitator shaft. The first transmission component 2402 is provided with a non-complete circular groove that can be mounted on the incomplete circular protrusion 7*c*. To prevent the developer from leaking, a seal is mounted at an end of the agitator shaft 7*a*. The seal may be a sealing sponge made of sponge material. Of course, it may also be made of other materials such as silicone and rubber. Then, the first transmission component 2402 is used to press the seal to prevent the seal from coming out. That is to say, the seal is mounted between the agitator shaft 7*a* and the first transmission component 2402. The first transmission component 2402 is provided with a helical groove 2402*a*, which rotates together with the agitator shaft 7*a*. A second transmission component 2302 is also provided on the second side 20 of the housing 1. The second transmission component 2302 can receive driving force of the first transmission component 2402 and move along the first direction. The second transmission component 2302 is provided with an inner hole 2302*c* that can be sleeved on the first transmission component 2402. The inner hole 2302*c* is provided with a bump 2302*a* protruding inward. The bump

2302*a* cooperates with the helical groove 2402*a*. When the first transmission component 2402 rotates, the second transmission component 2302 can be pushed to move along the first direction through the cooperation of the helical groove 2402*a* and the bump 2302*a*. The second transmission component 2302 is only provided with a pushing inclined surface 2302*b*. The side cover 2601 is provided with a developer roller bearing 2601*a*, a supply roller bearing (not shown in the figure), a pushing force receiving protrusion 2601*c*, a separating force receiving protrusion 2601*d* and a detected component mounting column 2601*b*. The detected component 2202 is provided with a supported hole 2202*a*, a toggle portion 2202*c* and a pushed inclined surface 2202*b*. There may be one or multiple pushed inclined surfaces 2202*b*. The pushed inclined surface 2202*b* may cooperate with the pushing inclined surface 2302*b* to receive force of the second transmission component 2302, so that the detected component 2202 swings around the detected component mounting column 2601*b*. When there are multiple pushed inclined surfaces 2202*b*, the detected component 2202 may receive the force of the second transmission component 2302 to swing repeatedly for many times. The developer roller shaft 2*a* is inserted into the developer roller bearing 2601*a* to be rotatably supported, and the supply roller shaft 9*a* is inserted into the supply roller bearing to be rotatably supported. When the developing cartridge needs to perform an image forming action, the pushing force receiving protrusion 2601*c* can receive force from a pushing unit of a drum assembly (not shown in the figure) mounted in the imaging device, so that the developer roller 2 in the developing cartridge is in tight contact with a photosensitive drum in the drum assembly. When the developing cartridge does not need to perform the image forming action, the separating force receiving protrusion 2601*d* receives force of a separating mechanism (not shown) in the imaging device, so that the developer roller 2 in the developing cartridge is separated from the photosensitive drum in the drum assembly. The side cover 2601, the detected component 2202 or both are made of conductive material. The toggle portion 2202*c* of the detected component 2202 can follow the rotation of the driving gear 4 to move and toggle a detection unit in the imaging device, so that the detection unit is moved and detected by the detection unit of the imaging device. At the same time, the detection unit in the imaging device is further provided with a power supply component. Therefore, the toggle portion 2202*c* may also be used as an electrical contact portion of an electrode to be in electrical contact with the imaging device, achieving the effect of integrating multiple functions in one component. The detected component 2202 and the side cover 2601 together form an electrode of the developing cartridge. The electrode is electrically connected to the developer roller shaft 2*a* and the supply roller shaft 9*a*, for example, through the developer roller bearing 2601*a* and the supply roller bearing. In addition, the chip 31 is provided on the first side of the housing 1, and the electrode is provided on the second side of the housing 1, which can suppress the interference of the electrical signal on the communication between the chip 31 and the imaging device due to the electrical contact between the electrode and the imaging device. In the first direction, the chip 31 may be provided at the leftmost end of the housing 1. In other words, in the first direction, at least a part of the electrical contact 31*a* of the chip 31 is closer to the outermost end of the housing 1 than the gear cover 33.

Embodiment 2

Figure 6:
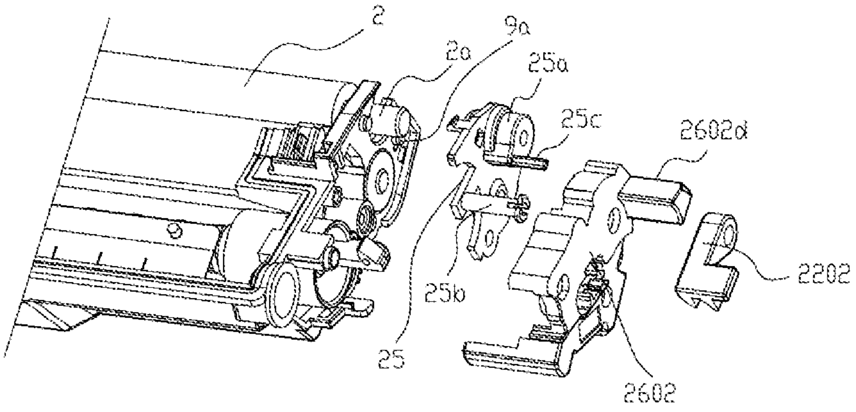
FIG. 6 is a schematic view of a partial exploded structure of an opposite side of a driving side of a developing cartridge provided in Embodiment 2.
Figure 7:
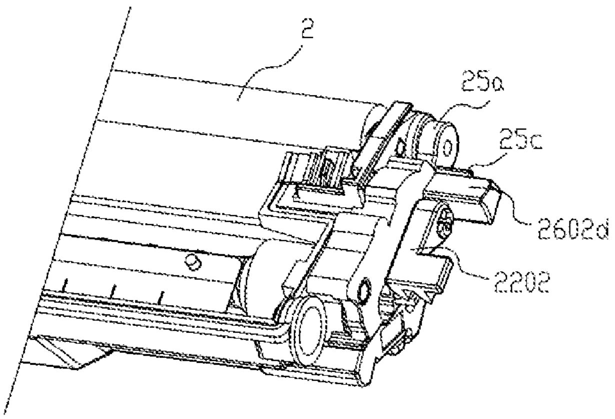
FIG. 7 is a schematic view of a partial three-dimensional structure of the opposite side of the driving side of the developing cartridge in Embodiment 2.

Embodiment 2 of the present disclosure will be described below. As shown in FIGS. 6 and 7, Embodiment 2 is mainly different from Embodiment 1 in that the electrode structure on the second side of the housing 1 and the structure of the separating force receiving protrusion are different. In this embodiment, the side cover 2602 is not used as a part of the electrode, and the bearing plate 25 is used as a part of the electrode. In this way, the side cover 2602 may be made of a more economical non-conductive resin material, saving the cost of the product. The bearing plate 25 is provided with a developer roller bearing 25*a* and a supply roller bearing (not shown in the figure) which rotatably support the developer roller shaft 2*a* and the supply roller shaft 9*a*, respectively. The bearing plate 25 is provided on the inner side of the side cover 2602, and at least a part of the bearing plate 25 is covered by the side cover 2602. The bearing plate 25 is also provided with a detected component mounting column 25*b* and a separating force receiving protrusion 25*c*. The separating force receiving protrusion 25*c* protrudes along the first direction, and the side cover 2602 is provided with a limiting portion 2602*d*. When the separating force receiving protrusion 25*c* receives force of the imaging device, the limiting portion 2602*d* can abut against the separating force receiving protrusion 25*c*, so as to prevent the separating force receiving protrusion 25*c* from being deformed in multiple degrees when receiving the force of the image forming device and thereby affecting the separation effect between the developer roller and the photosensitive drum, and can also prevent the separating force receiving protrusion 25*c* from being broken by an external force during the transportation of the developing cartridge. Specifically, the limiting portion 2602*d* may abut against the separating force receiving protrusion 25*c* or limit the shortest distance between the limiting portion 2602*d* and the separating force receiving protrusion 25*c* in the second direction to be less than 2 mm. In the second direction, a gap portion is formed between the separating force receiving protrusion 25*c* and the detected component 2202, and the limiting portion 2602*d* of the side cover 2602 is inserted into the gap portion as a wall portion. That is to say, at least a part of the side cover 2602 is inserted into the gap formed by the separating force receiving protrusion 25*c* and the detected component 2202. In this embodiment, the detected component 2202 and the bearing plate 25 each form a part of the electrode. The detected component 2202 and the bearing plate 25 may be made of a conductive resin material, and the side cover 2602 may be made of a non-conductive resin material.

Embodiment 3

Figure 8:
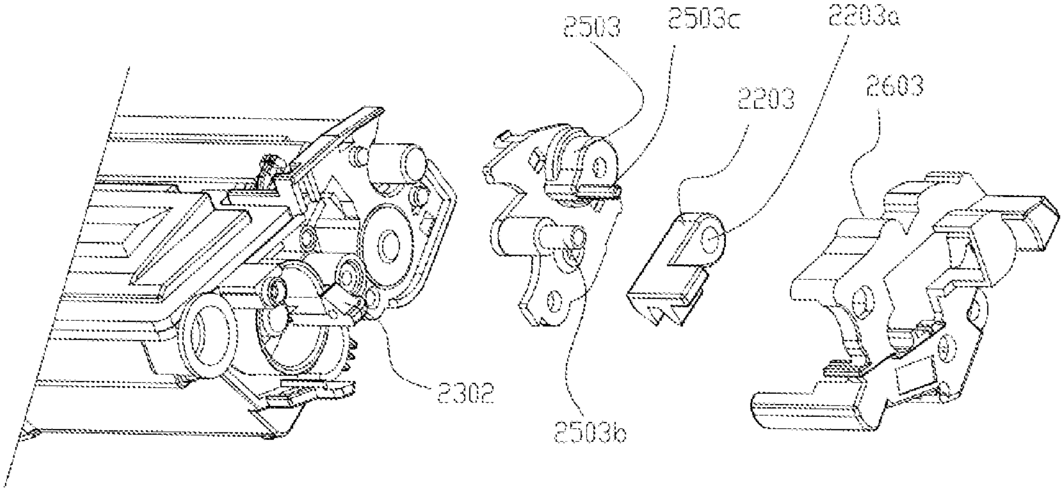
FIG. 8 is an exploded structural schematic view of an opposite side of a driving side of a developing cartridge in Embodiment 3.
Figure 9:
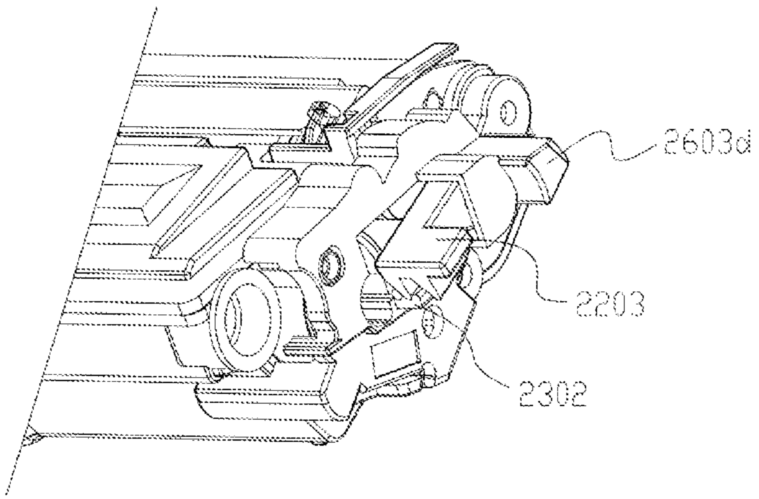
FIG. 9 is a partial structural schematic view of the opposite side of the driving side of the developing cartridge in Embodiment 3.
Figure 10:
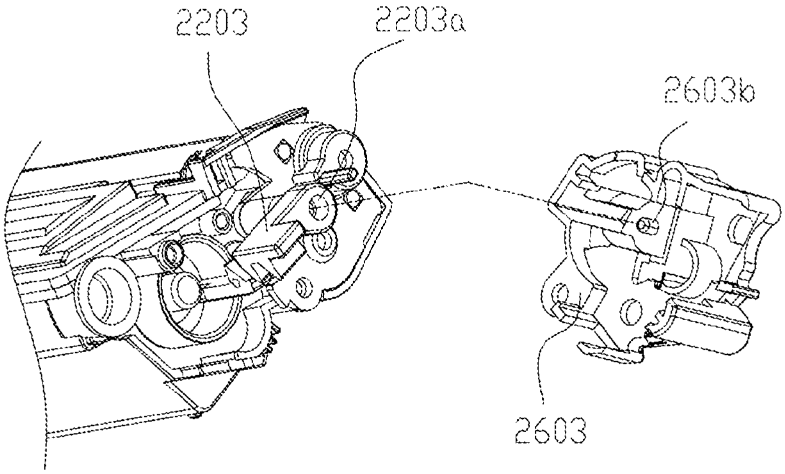
FIG. 10 is a schematic view of a mounting structure of a side cover on the driving side of the developing cartridge provided in Embodiment 3.

Embodiment 3 of the present disclosure will be described below. With reference to FIGS. 8 to 10, in this embodiment, the detected component 2203 is mounted on the bearing plate 2503, the detected component 2203 and the bearing plate 2503 form an electrode that is electrically connected to the developer roller shaft, and both are made of a conductive material, and at least a part of the detected component 2203 is covered by the side cover 2603. That is to say, in the first direction, the detected component 2203 is provided between the bearing plate 2503 and the side cover 2603, the separating force receiving protrusion 2503*c* is provided on the bearing plate 2503, and the side cover 2603 has a limiting portion 2603*d* located between the separating force receiving protrusion 2503*c* and the detected component 2203. The bearing plate 2503 is provided with a detected component mounting column 2503*b*, and the detected component 2203 is provided with a supported hole 2203*a* supported by the detected component mounting column. The side cover 2603 has a second support column 2603*b*, and the second support column 2603*b* may be inserted into the supported hole 2203*a* on the detected component 2203 to support the detected component 2203. That is to say, the supported hole 2203*a* can be supported by the bearing plate 2503 and the side cover 2603 at the same time. As a modified embodiment of this embodiment, the detected component mounting column 2503*b* supporting the detected component 2203 may also be provided close to the separating force receiving protrusion 2503*c*. When the detected component 2203 is mounted on the detected component mounting column 2503*b*, in the second direction, the shortest distance between the detected component 2203 and the separating force receiving protrusion 2503*c* is less than 2 mm, so as to limit excessive deformation of the separating force receiving protrusion 2503*c* in the second direction.

What is claimed is:

1. A developing cartridge, comprising:
- a housing;
- a developer roller having a developer roller shaft configured to rotate about a developer roller axis extending in a first direction;
- an agitator having an agitator shaft extending in the first direction;
- a driving gear configured to receive driving force from outside of the developing cartridge and located at a first side of the housing;
- an agitator gear mounted at an end of the agitator shaft, the end being at the first side of the housing;
- an electrode electrically connected to the developer roller shaft, the electrode having an electrical contact portion on a second side of the housing opposite to the first side in the first direction;
- a gear cover on the first side of the housing, covering at least a part of the driving gear and the agitator gear;
- a chip holder on the gear cover;
- a chip on the chip holder;
- a first transmission component at the second side;
- a second transmission component at the second side; and
- a detected component at the second side;
- a bearing plate and a side cover at the second side;
- wherein the first transmission component is at an end of the agitator shaft and configured to rotate with the agitator shaft;
- wherein the second transmission component is sleeved on the first transmission component to receive driving force of the first transmission component;
- wherein the detected component is configured to move by receiving force of the second transmission component;
- wherein the side cover covers at least a part of the bearing plate, the bearing plate is configured to support the developer roller shaft, the bearing plate comprises a separating force receiving protrusion that protrudes along the first direction, the side cover comprises a limiting portion; and
- wherein the shortest distance between the separating force receiving protrusion and the limiting portion is 2 mm in a second direction.

2. The developing cartridge according to claim 1, further comprising a seal between the agitator shaft and the first transmission component to prevent leakage of a developer.

3. The developing cartridge according to claim 1, wherein the detected component is on the bearing plate, a gap portion is between the separating force receiving protrusion and the detected component in the second direction, and the limiting portion is inserted into the gap portion.

4. The developing cartridge according to claim 1, further comprising a bearing plate at the second side;
- wherein the bearing plate is configured to support the developer roller shaft, the bearing plate comprises a separating force receiving protrusion that protrudes along the first direction, and the shortest distance between the separating force receiving protrusion and the detected component is in a second direction.

5. The developing cartridge according to claim 1, further comprising a bearing plate at the second side of the housing;
- wherein the bearing plate and the detected component are each configured to form a part of the electrode, the detected component comprises an electrical contact portion configured as a toggle detectable by an imaging device in which the developing cartridge is configured to be detachably mounted.

6. The developing cartridge according to claim 1, further comprising a bearing plate and a side cover at the second side;
- wherein the side cover covers at least a part of the bearing plate, the bearing plate comprises a detected component mounting column, the side cover comprises a second supporting column, the detected component comprises a supported hole, and both the detected component mounting column and the second supporting column are configured to be inserted into the supported hole.

7. The developing cartridge according to claim 1, wherein the first transmission component is integrally molded with the agitator shaft.

8. The developing cartridge according to claim 1, further comprising a bearing plate at the second side and a supply roller configured to convey a developer to the developer roller; wherein the bearing plate supports both the developer roller shaft and a supply roller shaft, and the bearing plate and the detected component are each configured to form a part of the electrode.

9. A developing cartridge, comprising:
- a housing;
- a developer roller having a developer roller shaft configured to rotate about a developer roller axis extending in a first direction;
- an agitator having an agitator shaft extending in the first direction;
- a driving gear configured to receive driving force from outside of the developing cartridge and located at a first side of the housing;
- an agitator gear mounted at an end of the agitator shaft, the end being at the first side of the housing;
- an electrode electrically connected to the developer roller shaft, the electrode having an electrical contact portion on a second side of the housing opposite to the first side in the first direction;
- a gear cover on the first side of the housing, covering at least a part of the driving gear and the agitator gear;
- a chip holder on the gear cover;
- a chip on the chip holder;
- a first transmission component at the second side;
- a second transmission component at the second side; and
- a detected component at the second side;
- a bearing plate at the second side;
- wherein the first transmission component is at an end of the agitator shaft and configured to rotate with the agitator shaft;
- wherein the second transmission component is sleeved on the first transmission component to receive driving force of the first transmission component; and wherein the detected component is configured to move by receiving force of the second transmission component;

wherein the bearing plate is configured to support the developer roller shaft, the bearing plate comprises a separating force receiving protrusion that protrudes along the first direction, and the shortest distance between the separating force receiving protrusion and the detected component is in a second direction.

10. The developing cartridge according to claim 9, further comprising a seal between the agitator shaft and the first transmission component to prevent leakage of a developer.

11. The developing cartridge according to claim 9, further comprising a bearing plate at the second side of the housing;

wherein the bearing plate and the detected component are each configured to form a part of the electrode, the detected component comprises an electrical contact portion configured as a toggle detectable by an imaging device in which the developing cartridge is configured to be detachably mounted.

12. The developing cartridge according to claim 9, further comprising a bearing plate and a side cover at the second side;

wherein the side cover covers at least a part of the bearing plate, the bearing plate comprises a detected component mounting column, the side cover comprises a second supporting column, the detected component comprises a supported hole, and both the detected component mounting column and the second supporting column are configured to be inserted into the supported hole.

13. The developing cartridge according to claim 9, wherein the first transmission component is integrally molded with the agitator shaft.

14. The developing cartridge according to claim 9, further comprising a bearing plate at the second side and a supply roller configured to convey a developer to the developer roller; wherein the bearing plate supports both the developer roller shaft and a supply roller shaft, and the bearing plate and the detected component are each configured to form a part of the electrode.

15. A developing cartridge, comprising:

a housing;

a developer roller having a developer roller shaft configured to rotate about a developer roller axis extending in a first direction;

an agitator having an agitator shaft extending in the first direction;

a driving gear configured to receive driving force from outside of the developing cartridge and located at a first side of the housing;

an agitator gear mounted at an end of the agitator shaft, the end being at the first side of the housing;

an electrode electrically connected to the developer roller shaft, the electrode having an electrical contact portion on a second side of the housing opposite to the first side in the first direction;

a gear cover on the first side of the housing, covering at least a part of the driving gear and the agitator gear;

a chip holder on the gear cover;

a chip on the chip holder;

a first transmission component at the second side;

a second transmission component at the second side; and a detected component at the second side;

a bearing plate at the second side and a supply roller configured to convey a developer to the developer roller;

wherein the first transmission component is at an end of the agitator shaft and configured to rotate with the agitator shaft;

wherein the second transmission component is sleeved on the first transmission component to receive driving force of the first transmission component; and wherein the detected component is configured to move by receiving force of the second transmission component;

wherein the bearing plate supports both the developer roller shaft and a supply roller shaft, and the bearing plate and the detected component are each configured to form a part of the electrode.

16. The developing cartridge according to claim 15, further comprising a seal between the agitator shaft and the first transmission component to prevent leakage of a developer.

17. The developing cartridge according to claim 15, further comprising a bearing plate at the second side of the housing;

wherein the bearing plate and the detected component are each configured to form a part of the electrode, the detected component comprises an electrical contact portion configured as a toggle detectable by an imaging device in which the developing cartridge is configured to be detachably mounted.

18. The developing cartridge according to claim 15, further comprising a bearing plate and a side cover at the second side;

wherein the side cover covers at least a part of the bearing plate, the bearing plate comprises a detected component mounting column, the side cover comprises a second supporting column, the detected component comprises a supported hole, and both the detected component mounting column and the second supporting column are configured to be inserted into the supported hole.

19. The developing cartridge according to claim 15, wherein the first transmission component is integrally molded with the agitator shaft.

* * * * *